(12) United States Patent
Bergeron

(10) Patent No.: US 11,392,488 B2
(45) Date of Patent: Jul. 19, 2022

(54) OPTIMIZING STORAGE OF APPLICATION DATA IN MEMORY

(71) Applicant: Keysight Technologies Singapore (Sales) Pte. Ltd., Singapore (SG)

(72) Inventor: Matthew R. Bergeron, Thousand Oaks, CA (US)

(73) Assignee: KEYSIGHT TECHNOLOGIES SINGAPORE (SALES) PTE. LTD., Singapore (SG)

( * ) Notice: Subject to any disclaimer, the term of this patent is extended or adjusted under 35 U.S.C. 154(b) by 54 days.

(21) Appl. No.: 15/948,728

(22) Filed: Apr. 9, 2018

(65) Prior Publication Data
US 2018/0293163 A1      Oct. 11, 2018

Related U.S. Application Data

(60) Provisional application No. 62/483,293, filed on Apr. 7, 2017.

(51) Int. Cl.
*G06F 12/00*       (2006.01)
*G06F 12/02*       (2006.01)

(52) U.S. Cl.
CPC ........ *G06F 12/023* (2013.01); *G06F 12/0292* (2013.01); *G06F 2212/1016* (2013.01); *G06F 2212/1044* (2013.01); *G06F 2212/502* (2013.01)

(58) Field of Classification Search
CPC ........... G06F 12/023; G06F 2212/1016; G06F 12/0292; G06F 2212/1044; G06F 2212/502
See application file for complete search history.

(56) References Cited

U.S. PATENT DOCUMENTS

| | | |
|---|---|---|
| 6,412,000 B1 | 6/2002 | Riddle et al. |
| 7,032,072 B1 | 4/2006 | Quinn et al. |
| 7,230,627 B2 | 6/2007 | Freker et al. |
| 7,412,369 B1 | 8/2008 | Gupta |
| 7,580,356 B1 | 8/2009 | Mishra et al. |

(Continued)

FOREIGN PATENT DOCUMENTS

WO     WO 2014/074168 A1      5/2014

OTHER PUBLICATIONS

Notice of Allowance and Fee(s) Due for U.S. Appl. No. 14/944,078 (dated Dec. 4, 2018).

(Continued)

*Primary Examiner* — Gurtej Bansal

(57) ABSTRACT

Methods, systems, and computer readable media for optimizing storage of application data in memory are disclosed. According to one method for optimizing storage of application data in memory, the method includes receiving application data associated with an application. The method also includes generating, using information about the application, information about a processor, and information about a memory, a memory map indicating one or more memory locations in the memory for storing the application data. The method further includes storing, using the memory map, the application data in the one or more memory locations. The method also includes executing, using the processor, the application that uses the application data.

21 Claims, 5 Drawing Sheets

(56) References Cited

U.S. PATENT DOCUMENTS

| | | | |
|---|---|---|---|
| 7,949,850 B2* | 5/2011 | Swanson | G06F 11/1666 |
| | | | 711/173 |
| 8,595,432 B1* | 11/2013 | Vinson | G06F 3/0611 |
| | | | 710/240 |
| 8,656,135 B2 | 2/2014 | Gounares et al. | |
| 10,230,824 B2 | 3/2019 | Bergeron | |
| 2003/0081615 A1 | 5/2003 | Kohn et al. | |
| 2007/0008888 A1 | 1/2007 | Chawla et al. | |
| 2008/0016308 A1* | 1/2008 | Bartley | G06F 12/0802 |
| | | | 711/167 |
| 2008/0162807 A1* | 7/2008 | Rothman | G06F 13/161 |
| | | | 711/114 |
| 2009/0106506 A1 | 4/2009 | Skerlj et al. | |
| 2012/0039332 A1 | 2/2012 | Jackowski et al. | |
| 2013/0058230 A1 | 3/2013 | Wvong et al. | |
| 2015/0341473 A1 | 11/2015 | Dumitrescu et al. | |
| 2016/0018990 A1* | 1/2016 | Yun | G06F 1/3293 |
| | | | 711/103 |
| 2016/0140045 A1 | 5/2016 | Bergeron | |

OTHER PUBLICATIONS

Advisory Action for U.S. Appl. No. 14/944,078 (dated Apr. 30, 2018).
Commonly-Assigned, co-pending U.S. Appl. No. 15/948,728 for "Optimizing Storage of Application Data In Memory," (Unpublished, filed Apr. 9, 2018).
3D XPoint, https://en.wikipedia.org/wiki/3D_XPoint, pp. 1-4 (Mar. 22, 2018).
Non-Final Office Action for U.S. Appl. No. 14/944,078 (dated Jul. 19, 2018).
Applicant-Initiated Interview Summary for U.S. Appl. No. 14/944,078 (dated Oct. 12, 2018).
3D XPoint, https://en.wikipedia.org/wiki/3D_XPoint, pp. 1-4 (Mar. 22, 2018) (Downloaded from the Internet Apr. 6, 2018).
Final Office Action for U.S. Appl. No. 14/944,078 (dated Jan. 26, 2018).
Non-Final Office Action for U.S. Appl. No. 14/944,078 (dated Jul. 26, 2017).
Pessl et al., "Reverse Engineering Intel DRAM Addressing and Exploitation," http://arxiv.org/pdf/1511.08756v2, pp. 1-10 (Nov. 30, 2015).
"Lacking Rhoticity: How physical addresses map to rows and banks in DRAM," pp. 1-6 (May 4, 2015).
"IxNetwork:Specifications," Ixia, Deliver on (Jul. 8, 2013).

\* cited by examiner

300

|   | A | B | C | D | E | F |
|---|---|---|---|---|---|---|
| 1 |   |   |   |   |   |   |
| 2 |   |   |   |   |   |   |
| 3 |   |   | X-Z |   |   |   |
| 4 |   |   |   |   |   |   |
| 5 |   |   |   |   |   |   |
| 6 |   |   |   |   |   |   |

|   | A | B | C | D | E | F |
|---|---|---|---|---|---|---|
| 1 |   |   |   | Z |   |   |
| 2 |   |   |   |   |   |   |
| 3 | X-Z | Z | Y |   |   |   |
| 4 |   |   |   |   | Y |   |
| 5 | X | X |   | X |   |   |
| 6 |   | Y | Z |   |   | X-Z |

FIG. 4

OPTIMIZING STORAGE OF APPLICATION DATA IN MEMORY

PRIORITY CLAIM

This application claims the priority benefit of U.S. Provisional Patent Application Ser. No. 62/483,293 filed Apr. 7, 2017, the disclosure of which is incorporated herein by reference in its entirety.

TECHNICAL FIELD

The subject matter described herein relates to computer memory optimization. More specifically, the subject matter relates to methods, systems, and computer readable media for optimizing storage of application data in memory.

BACKGROUND

Various types of computer memory, such as a dynamic random-access memory (DRAM) module, have access characteristics (e.g., access restrictions or constraints) that can affect how quickly data stored in memory is accessed or written. For example, a particular DRAM module may be associated with access characteristics, such as memory timings, that affect memory performance and/or how often a memory or a portion therein (e.g., a memory bank) is accessible. In this example, varying delays (e.g., memory related latencies) may be associated with activating a row in memory, de-activating a row in memory, reading data, writing data, and/or other memory related actions. Since applications typically store and access various amounts of data in memory during operation, application performance can be improved significantly if application data is more optimally stored in memory.

SUMMARY

Methods, systems, and computer readable media for optimizing storage of application data in memory are disclosed. One method for optimizing storage of application data in memory includes receiving application data associated with an application. The method also includes generating, using information about the application, information about a processor, and information about a memory, a memory map indicating one or more memory locations in the memory for storing the application data. The method further includes storing, using the memory map, the application data in the one or more memory locations. The method also includes executing, using the processor, the application that uses the application data.

A system for optimizing storage of application data in memory includes a first processor and a data storage optimizer implemented using the first processor. The data storage optimizer is configured to receive application data associated with an application, to generate, information about the application, information about a second processor, and information about a memory, a memory map indicating one or more memory locations in the memory for storing the application data, to store, using the memory map, the application data in the one or more memory locations, and to execute, using the second processor, the application that uses the application data.

The subject matter described herein may be implemented in software in combination with hardware and/or firmware. For example, the subject matter described herein may be implemented in software executed by a processor. In one exemplary implementation, the subject matter described herein may be implemented using a non-transitory computer readable medium having stored therein computer executable instructions that when executed by the processor of a computer control the computer to perform steps. Exemplary computer readable media suitable for implementing the subject matter described herein include non-transitory devices, such as disk memory devices, chip memory devices, programmable logic devices, field-programmable gate arrays, and application specific integrated circuits. In addition, a computer readable medium that implements the subject matter described herein may be located on a single device or computer platform or may be distributed across multiple devices or computer platforms.

As used herein, the term 'node' refers to a physical computer platform including at least one processor and/or at least one memory.

As used herein, each of the terms 'function', 'engine', and 'module' refers to hardware or firmware, which may also include software, for implementing the feature(s) being described.

BRIEF DESCRIPTION OF THE DRAWINGS

The subject matter described herein will now be explained with reference to the accompanying drawings of which:

FIG. 3 is a diagram illustrating a memory map depicting memory locations containing application data according to an embodiment of the subject matter described herein;

FIG. 4 is a diagram illustrating a memory map depicting preferred memory locations containing application data according to an embodiment of the subject matter described herein.

DETAILED DESCRIPTION

The subject matter described herein relates to methods, systems, and computer readable media for optimizing storage of application data in memory. Processor related memory, such as a DRAM module, may be associated with access and/or usage characteristics, such as memory timings, that can affect memory performance and/or how often a memory or a portion therein (e.g., a memory bank) is accessible. Since applications typically store and access various amounts of data in memory during operation, application performance may be improved if application data is optimally stored in memory. However, such data storage optimization is generally not performed because address mapping information for various memories and processors is typically unknown.

In accordance with some aspects of the subject matter described herein, equipment, techniques, methods, or mechanisms are disclosed for optimizing storage of application data in memory. For example, a processor related memory (e.g., a DRAM or non-DRAM memory) may be mapped or otherwise utilized such that copies and/or portions of application data can be stored in preferable memory locations for optimizing an application's performance and/ or other purposes. In this example, a memory map may be usable for directing where in a DRAM certain data is stored, e.g., storing copies of application data into different DRAM banks or in the same DRAM row and then accessing the different memory locations in a manner for optimal throughout.

Advantageously, in accordance with some aspects of the subject matter described herein, a data storage optimizer in accordance with some aspects described herein may determine a memory map for a particular computing environment and/or memory configuration and may use the memory map to optimize application-specific memory storage, e.g., such that data associated with an application is stored in memory locations that improve application performance, e.g., by decreasing memory related latencies and/or by improving memory related bandwidth associated with the application.

Reference will now be made in detail to exemplary embodiments of the subject matter described herein, examples of which are illustrated in the accompanying drawings. Wherever possible, the same reference numbers will be used throughout the drawings to refer to the same or like parts.

Figure 1:
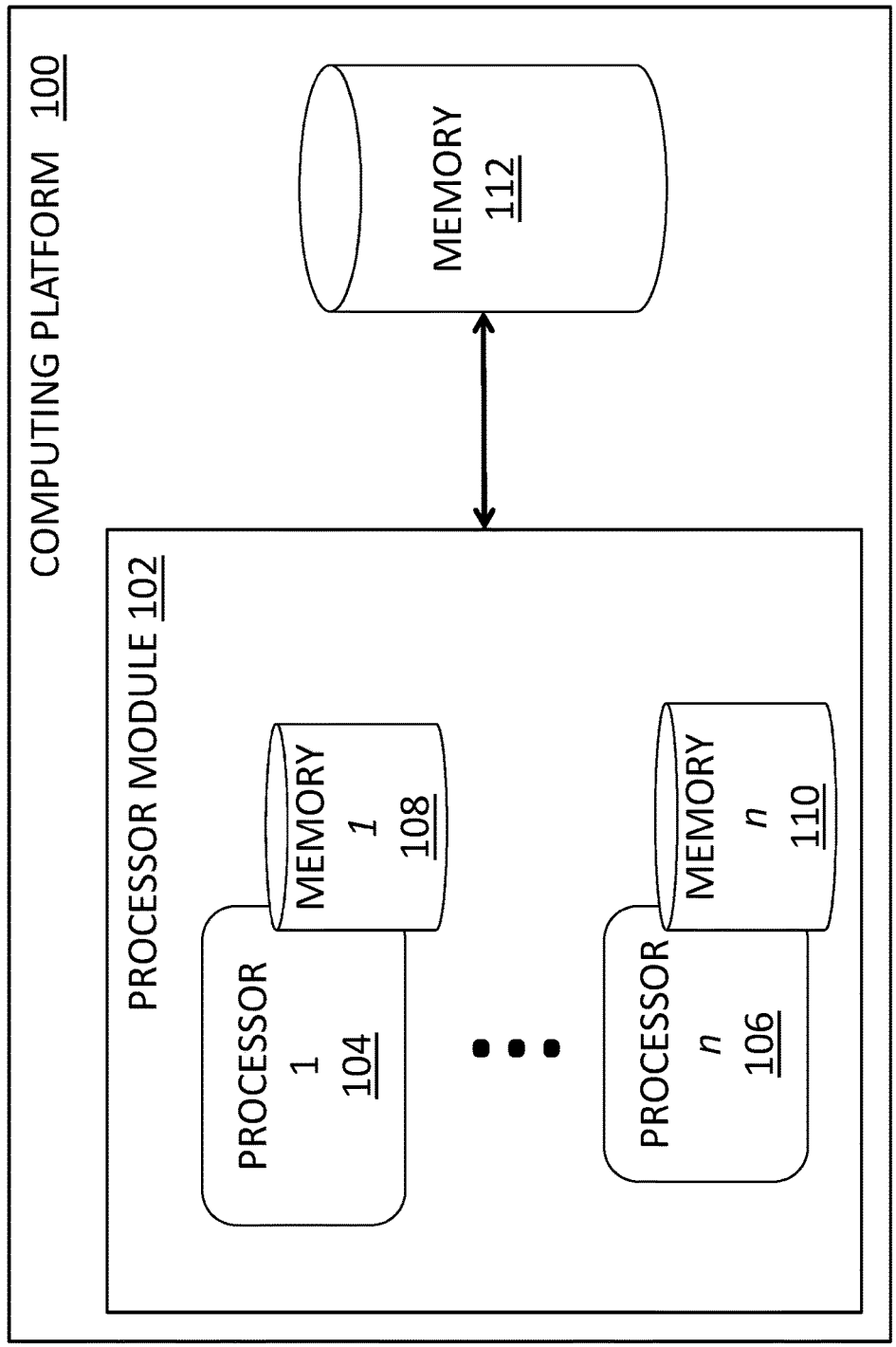
FIG. 1 is a block diagram illustrating a computing platform according to an embodiment of the subject matter described herein.

FIG. 1 is a block diagram illustrating a computing platform 100 according to an embodiment of the subject matter described herein. Computing platform 100 may represent any suitable entity or entities (e.g., one or more computers, nodes, or devices) associated with optimizing storage of application data in memory. For example, computing platform 100 may be a single node or may be distributed across multiple computing platforms or nodes.

Computing platform 100 may include a processing module 102 and a memory 112. Processing module 102 may represent any suitable entity (e.g., a stand-alone device, a node, or an integrated chip) for containing one or more processors (e.g., processors 104-106) and processor related memories (e.g., memories 108-110). For example, processing module 102 may represent an integrated chip with multiple central processing units (CPUs) or processor cores and multiple dual in-line memory modules (DIMMs), where each of the CPUs or processor cores may utilize one or more of the DIMMs. Processing module 102 may also interact with other entities (e.g., components, nodes, devices, and/or functions) within computing platform 100 and with entities external to computing platform 100.

Processors 104-106 may represent any suitable entities (e.g., one or more physical or hardware implemented general purpose processors) for executing software (e.g., computer executable instructions). Processors 104-106 may be usable for executing one or more applications and may access application data stored in memories 108-112 or memory locations therein. For example, processor 104 may access memory 108 when executing an application and processor 106 may access memory 110 when executing another application. In another example, processors 104-106 may execute the same application using at least one of memories 108-110. In yet another example, a binary or executable file representing an application or related data may be stored in memory 112 (e.g., an off-chip memory device or module) and may be transferred to one of memories 108-110 as-needed, e.g., when the application is executing and/or the application data is needed.

In some embodiments, each of processors 104-106 may represent or include a CPU, a multi-core processor, a single-core processor, a digital signal processor, a microprocessor, or a vector processor. For example, processor 104 may represent a first processor core and processor 106 may represent a second (e.g., different) processor core. In this example, each of processors 104-106 may be capable of executing instructions in parallel (e.g., concurrently) or independently of other processor cores.

Memories 108-112 may be any suitable entities (e.g., a storage device, a memory module, a non-transitory computer readable medium, or a storage system) for maintaining or storing application data, executable instructions, and/or other information. In some embodiments, each of memories 108-110 may represent a processor cache or a memory module located in processing module and/or may be accessible to at least one of processors 104-106. In some embodiments, memory 112 may represent a memory storage device, a memory chip, or a memory module separate from processing module 102. For example, where processing module 102 represents an integrated chip containing multiple processors 104-106 and memories 108-110, memory 112 may represent a distinct storage device or module (e.g., a flash memory) that is accessible by processors 104-106, but may be slower than on-chip memories, e.g., memories 108-110.

In some embodiments, each of memories 108-112 may represent or include a static random-access memory (SRAM), a DRAM, a 3D XPoint memory, a random-access memory, a solid state memory, a non-volatile memory, or a volatile memory. For example, each of memories 108-110 may represent a double data rate fourth-generation (DDR4) synchronous DRAM (SDRAM) and memory 112 may represent a flash memory or a solid-stale memory device.

Each of memories 108-112 may be affected by various access restrictions and/or characteristics that affect memory usage and/or access. For example, memory 110 may include a DRAM or other memory that is organized into ranks, banks, rows, and/or channels. In this example, processor 106 may be capable of accessing data from two different banks simultaneously (e.g., concurrently), but may experience memory related access latency during a row conflict, e.g., when trying to sequentially access data from different rows of the same bank. Continuing with this example, to minimize memory related access latency, some related data (e.g., data that is generally accessed concurrently or sequentially by an application) may be stored in preferred memory locations that avoid row conflicts or other memory related latency scenarios.

It will be appreciated that FIG. 1 is for illustrative purposes and that various nodes, their locations, and/or their functions (e.g., modules) described above in relation to FIG. 1 may be changed, altered, added, or removed. For example, some nodes and/or functions may be combined into a single entity. In another example, some nodes and/or functions may be distributed across multiple nodes and/or platforms.

Figure 2:
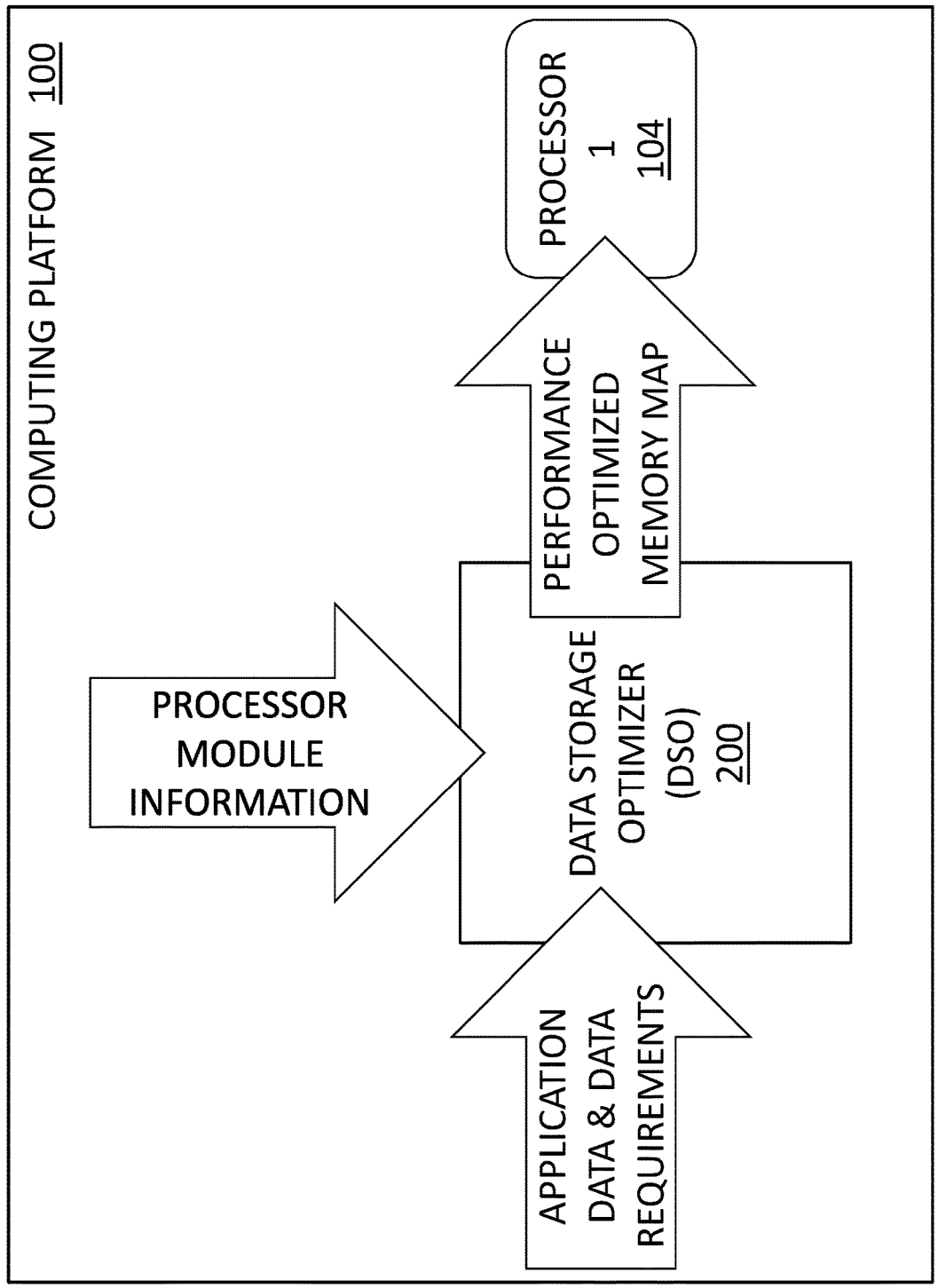
FIG. 2 is a block diagram illustrating a data storage optimizer (DSO) according to an embodiment of the subject matter described herein.

FIG. 2 is a block diagram illustrating a data storage optimizer (DSO) 200 according to an embodiment of the subject matter described herein. DSO 200 may represent any suitable entity or entities (e.g., software executing on at least one processor, a network node, a testing platform, and/or computing platform 100) for performing one or more aspects associated with optimizing storage of application data in memory. For example, DSO 200 may utilize one or more algorithms and/or techniques for generating a memory map (e.g., a data structure or other information for indicating how or where data is stored in a memory by a CPU). In this example, after generating a memory map, DSO 200 may store application in one or more memory locations based on the memory map such that an application has improved performance when executed by processor 104.

In some embodiments, DSO 200 may be located in or integrated with computing platform 100. For example, DSO 200 may be implemented using processor 104 and/or 106 or a memory controller. In another example, DSO 200 may be implemented using hardware (e.g., a processor and a memory located on an integrated chip) distinct from processing module 102. In some embodiments, DSO 200 may be located in or integrated with another computing platform or node, e.g., a node that is distinct from computing platform 100.

In some embodiments, DSO 200 may be associated with a memory management unit (MMU) and/or a memory controller unit (MCU), e.g., within processing module 102 or processors therein. For example, DSO 200 may be software and/or firmware implemented in a MCU or MMU associated with processor 106. In this example, DSO 200 may provide input or instructions to MCU or MMU when determining how to map application data to memory locations (e.g., memory blocks) of memory 106.

In some embodiments, DSO 200 may utilize one or more techniques, methods, or steps for generating a memory map, e.g., a map indicative of where or how data associated with physical memory addresses are stored in (e.g., mapped to) processor related memories, e.g., memories 108-110. For example, DSO 200 may reverse engineer how processor 104 stores application data or other information in memory 108 containing DRAM. In this example, DSO 200 may use software or related logic to monitor timing differences associated with accessing different memory locations of memory 108. Continuing with this example, DSO 200 may determine that some sets of physical memory address map to a same bank and a same row. DSO 200 may also determine that some sets of physical memory address map to a same bank but different rows based on the assumption that row conflicts lead to higher access times. After identifying these related sets of physical memory addresses, DSO 200 may determine a memory map or memory related addressing information such that DSO 200 or a related entity (e.g., processor 104 or an application to be executed) can identify or determine preferred memory locations, e.g., memory locations that minimize row conflicts, bank conflicts, and/or memory access related latencies.

In some embodiments, DSO 200 may be capable of mapping physical memory addresses into memory locations (e.g., memory blocks or other units of storage) of particular memory configurations. For example, portions (e.g., bits) of a physical memory address related to application data may determine or indicate where the application data is to be stored in memory 108, e.g., three lower bits of the physical address may be used as a byte index into a 64-bit (8-byte) memory word, the next bits may be used for column selection, one bit in between may be used for channel addressing, followed by bits responsible for bank, rank, and DIMM addressing with remaining upper bits being used for row selection.

In some embodiments, DSO 200 may use predetermined mapping information and/or historical mapping information for generating a memory map. For example, DSO 200 may store mapping related information in memory 112. In this example, the mapping related information may be indexed and/or searchable based on one or more criteria, such as processor type, memory type and/or configuration, and/or application-specific factors, such as a memory usage profile. In this example, DSO 200 may determine a relevant memory map or memory related addressing information using the stored mapping related information such that DSO 200 or a related entity (e.g., processor 104 or an application to be executed) can identify or determine preferred memory locations for application data for a particular application.

In some embodiments, DSO 200 may use one or more techniques for reverse engineering DRAM mapping and/or generating a memory map based on or derived from the manuscript entitled, "Reverse Engineering Intel DRAM Addressing and Exploitation", located at http://arxiv.org/pdf/1511.08756v2; the disclosure of which is incorporated by reference in its entirety.

In some embodiments, DSO 200 and/or a related entity may utilize knowledge or information about an application, a processor for executing the application, and/or a memory for determining how application data is to be stored. For example, after obtaining memory related addressing information associated with memory 110, DSO 200 may use relevant memory usage information, e.g., memory usage and/or access pattern(s) associated with an application, for determining where and/or how many copies and/or portions of application data are to be stored. In this example, DSO 200 may store or trigger storing data in particular memory locations associated with memory 110 so as to improve performance, reduce row-buffer conflicts, reduce bank conflicts, minimize effects of row hammer attacks, reduce memory related access latency, and/or improve user experience.

In another example, DSO 200 may characterize memory 108 (e.g., a DRAM) using random or pseudo-random physical memory addresses without any knowledge about how a particular application utilizes memory 108, but may analytically determine optimal memory locations for storing application data in memory 108 using knowledge about the application. In this example, the optimal memory locations may include copies and/or portions of the application data for improving performance, reducing memory related access latency, and/or other reasons.

In some embodiments, DSO 200 and/or a related entity may utilize arbitrary test data and/or actual application data when generating a memory map and/or determining memory related addressing information. For example, DSO 200 or a related entity may trigger the execution of an application (e.g., by processors 104-106) or a simulation thereof and may monitor how application data is accessed, created, or deleted in memories 108-110. In this example, DSO 200 may determine memory usage information associated with the application and may use the memory usage information when determining where and/or how many copies and/or portions of application data should be stored in memories 108-110. In another example, DSO 200 or a related entity may use test data that is representative of an application's memory usage information or is usable to derive such memory usage information. In this example, DSO 200 may use the test data or information derived from the test data when determining where and/or how many copies and/or portions of application data should be stored in memories 108-110.

In some embodiments, memory usage information may include any information indicative of how an application accesses or uses processor related memory. For example, memory usage information may indicate memory usage or access patterns, such as whether memory usage or access is sequential or random, how often an application reads or writes data, the amount of data written or read, and/or the frequencies of such actions.

In some embodiments, DSO 200 and/or a related entity may determine or influence how an application or a related processor accesses different copies or portions of application data when an application is executed. For example, DSO 200 may configure a MCU to track different copies or portions of application data such that the MCU accesses relevant application data from one of the memory locations that has the least memory related latency associated with it. In this example, the MCU may identify a preferred memory location storing the relevant data based on memory characteristics, memory statistics, and/or a current memory state, e.g., the current active row and the current active bank of a DIMM prior to the request for application data.

Figure 3:
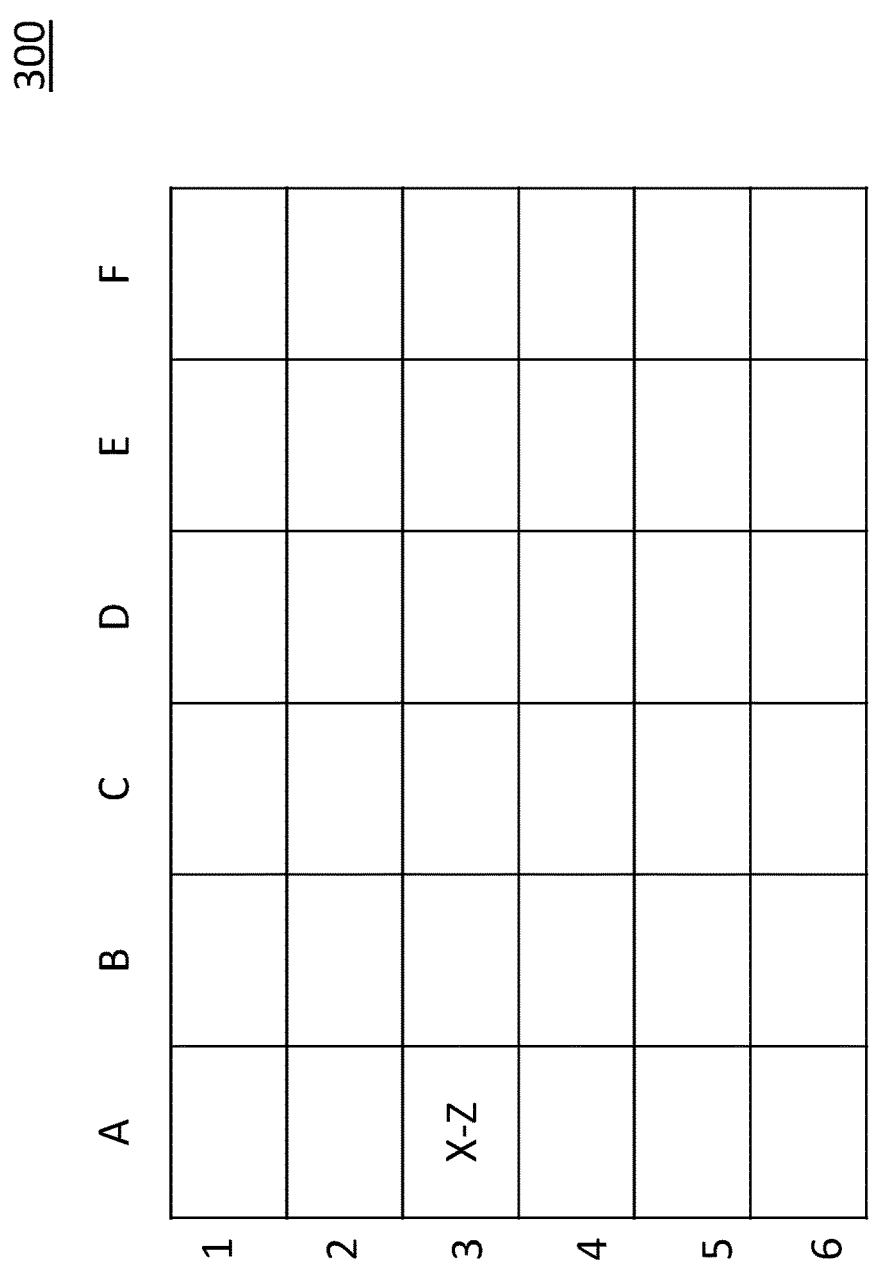

FIG. 3 is a diagram illustrating a memory map 300 depicting memory locations containing application data according to an embodiment of the subject matter described herein. In some embodiments, memory map 300 may be considered non-optimized and may depict memory locations for storing application data based on default or typical configuration information, e.g., without input or instructions from DSO 200 or features described herein.

In some embodiments, memory map 300 may be associated with a DRAM or other type of memory, where each block may represent a memory block (e.g., a unit of memory storage) and each row in memory map 300 may represent a row (e.g., within a memory bank) of the memory.

For illustrative purposes, each row in memory map 300 is represented by a unique number, and each column in memory map 300 is represented by a unique letter. As depicted in memory map 300, memory blocks may be referred to by the relevant column letter and the relevant row number, e.g., the first (e.g., left-most) memory block on the first (e.g., top) row may be referred to as memory block 'A1'. As shown, a memory block 'A3' stores application data 'X-Z'. Application data 'X-Z' may represent any data that is called or used by an application when executed by a processor, e.g., processor 106. In some embodiments, application data 'X-Z' may represent multiple portions of application data (e.g., 'X', 'Y', and '2') that can potentially be stored in different memory locations for various reasons.

It will be appreciated that memory map 300 is for illustrative purposes and that memory locations and data therein may be represented using various data structures and/or data constructs.

Figure 4:
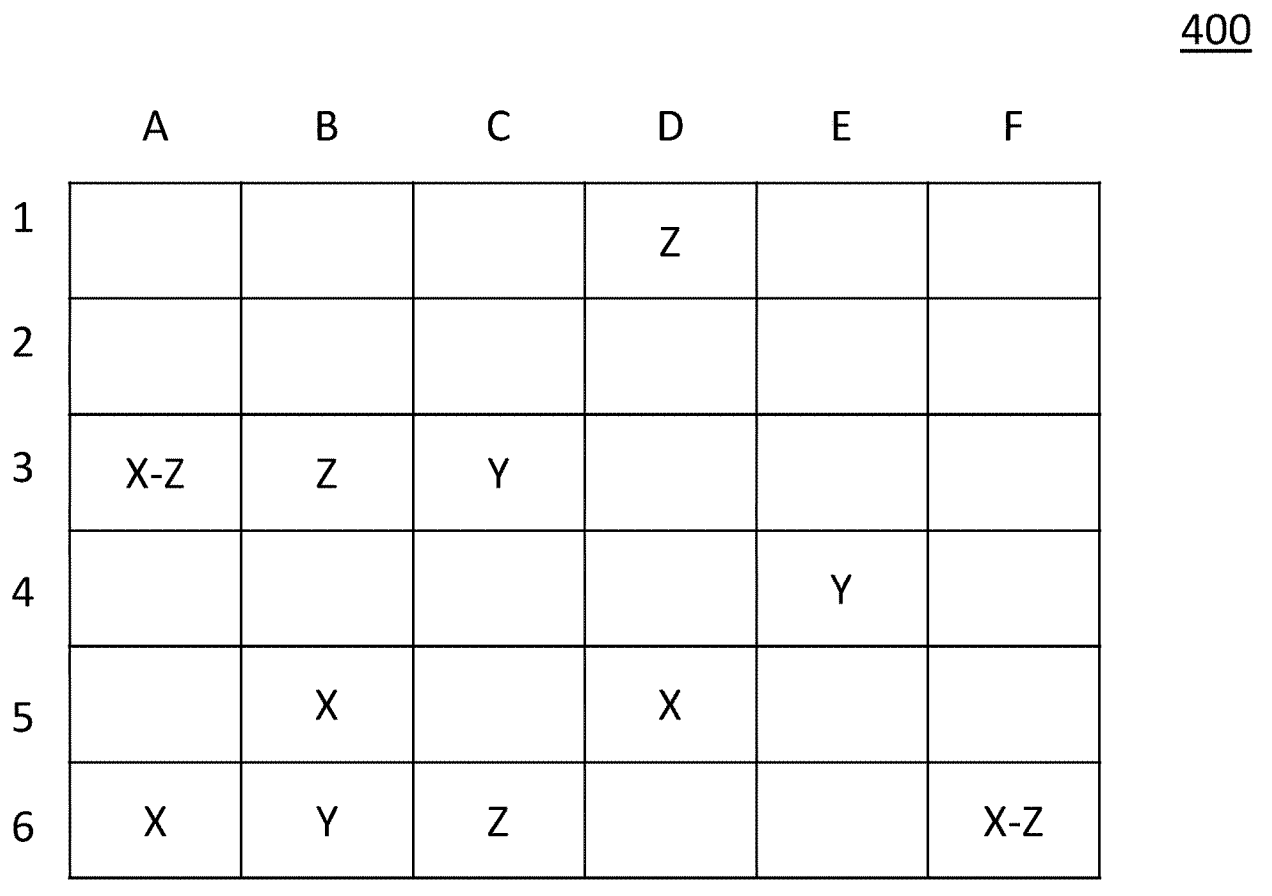

FIG. 4 is a diagram illustrating a memory map 400 depicting preferred memory locations containing application data according to an embodiment of the subject matter described herein. In some embodiments, memory map 400 may be considered optimized and may depict memory locations for storing application data based on input or instructions from DSO 200 or features described herein.

In some embodiments, memory map 400 may be associated with a DRAM or other type of memory, where each block may represent a memory block (e.g., a unit of memory storage) and each row in memory map 400 may represent a row (e.g., within a memory bank) of the memory. In some embodiments, application data 'X-Z' may represent multiple portions of application data (e.g., 'X', 'Y', and 'Z') that can potentially be stored in different memory locations for various reasons.

In some embodiments, memory map 400 may represent or indicate memory locations for storing application data. For example, DSO 200 or a related entity may determine how processor 106 stores data in memory 110 and may use that knowledge to identify preferred memory locations for storing copies and/or portions of application data within memory 110 such that memory related latencies are reduced and/or application related performance is improved. In this example, these memory locations may reduce row conflicts, bank conflicts, effectiveness of row hammer attacks (e.g., where two different rows in a memory bank are alternately accessed multiple times), and/or other memory related latency issues.

For illustrative purposes, each row in memory map 400 is represented by a unique number, and each column in memory map 400 is represented by a unique letter. As depicted in memory map 400, copies of application data 'X-Z' may be stored in memory blocks 'A3', and 'F6', copies of application data 'X' may be stored in memory blocks 'B5', 'D5', and 'A6', copies of application data 'Y' may be stored in memory blocks 'C3', 'D4', and 'B6', and copies of application data CZ' may be stored in memory blocks 'D1', 'B3', and 'C6'.

It will be appreciated that memory map 400 is for illustrative purposes and that memory locations and data therein may be represented using various data structures and/or data constructs.

Figure 5:
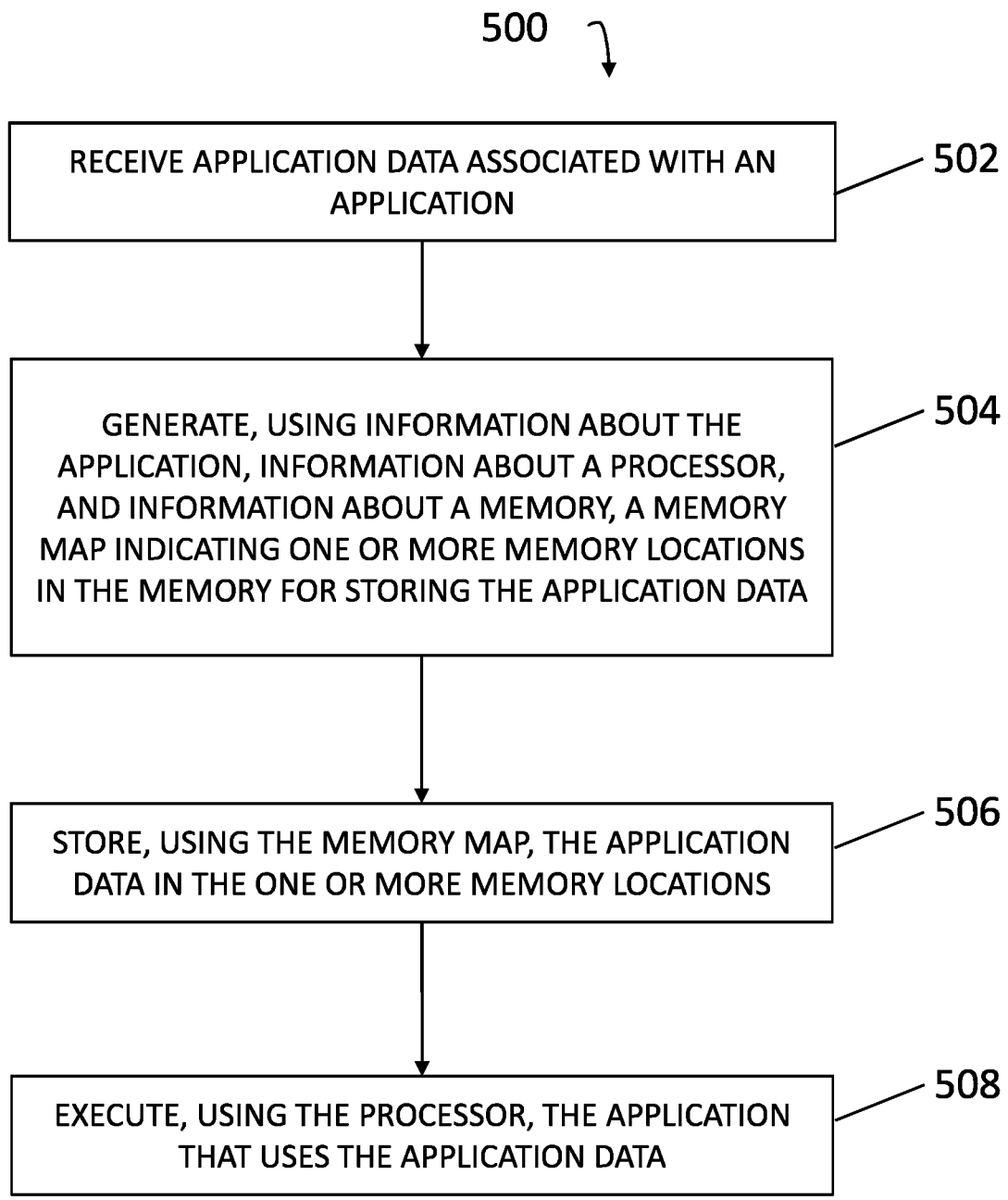
FIG. 5 is a flow chart illustrating a process for optimizing storage of application data in memory according to an embodiment of the subject matter described herein.

FIG. 5 is a flow chart illustrating a process 500 for optimizing storage of application data in memory according to an embodiment of the subject matter described herein. In some embodiments, process 500, or portions thereof (e.g., steps 502, 504, 506, and/or 510), may be performed by or at computing platform 100, DSO 200, processor 104, processor 106, and/or another node or module.

Referring to process 500, in step 502, application data associated with an application may be received. For example, DSO 200 may receive a number of user preferences associated with a visual effects editing program.

In step 504, a memory map may be generated using information about the application, information about a processor, and information about a memory. In some embodiments, the memory map may indicate one or more memory locations in the memory for storing the application data.

In some embodiments, a memory may include an SRAM, a DRAM, a 3D XPoint memory, a random-access memory, a solid state memory, a non-volatile memory, or a volatile memory. For example, a 3D XPoint memory may represent or include any memory with a cross point array structure or a related architecture. In this example, the cross point architecture may involve a transistor-less, three-dimensional checkerboard of memory cells, where the memory cells are located at the intersection of words lines and bit lines. Continuing with this example, in this architecture, each memory cell may be addressed individually, thereby allowing data to be written and read quickly and efficiently (e.g., in small amounts).

In some embodiments, a processor may include a CPU, a multi-core processor, a single-core processor, a digital signal processor, a microprocessor, or a vector processor.

In some embodiments, information about an application may include information about how often application data is accessed or information about when the application data is accessed.

In some embodiments, information about a processor may include a memory bandwidth associated with the processor or a processing rate associated with the processor.

In some embodiments, information about a memory may include memory timing information, a memory clock, a cycle time, a bus clock, a data rate, a peak transfer rate, or a column address strobe latency.

In some embodiments, generating a memory map may include identifying, based on memory access latency analysis, memory address sets, wherein each set includes memory addresses having a same rank, bank, row, or channel, and determining, using the memory address sets, address mapping information usable for selecting particular memory locations in the memory for storing data. For example, DSO 200 may generate a memory map of memory 108 by storing data in various memory locations of memory 108 and may identify, based on increased access times, which memory locations are related, e.g., in the same rank, bank, channel, and/or row. In this example, after determining related memory locations, DSO 200 may assume that memory addressing functions are linear and may determine mapping information (e.g., memory addressing functions) using the identified memory location relationships.

Mapping information (e.g., one or more memory addressing functions) may include or involve any method, application programming interface (API), technique, and/or algorithm associated with storing data in memory using a memory address (e.g., a CPU related memory address), or portions thereof. For example, mapping information and/or memory addressing functions may include or involve determining a memory address format used by a particular processor. In this example, the memory address format may indicate how a memory address, or portions (e.g., bits) thereof, corresponds to a particular location (e.g., a particular DIMM, rank, bank, row, and/or column) in memory (e.g., DRAM).

In some embodiments, generating a memory map may include using predetermined address mapping information associated with the memory. For example, DSO 200 may access address mapping information stored in memory 112. In this example, address mapping information may indicate how a particular processor maps physical memory addresses to a particular memory configuration associated with the processor. Continuing with this example, memory 112 may store multiple sets of address mapping information, e.g., one set for each particular memory and/or processor configurations. In some embodiments, predetermined sets of address mapping information may be determined by a manufacturer or via prior analysis by DSO 200.

In some embodiments, generating a memory map may include executing an application or a simulated application for identifying a memory access profile (e.g., memory usage information associated with an application) and may use the memory access profile for identifying the one or more memory locations in the memory for storing the application data. For example, if DSO 200 determines that application data 'X' is accessed twice as frequently as application data 'Y', DSO 200 may store copies of application data 'X' in multiple memory banks of memory 108 but may only store a single copy of application data 'Y' in one memory bank of memory 108.

In step 506, the application data may be stored in the one or more memory locations using the memory map. For example, after determining memory access patterns associated with a particular application and generating a memory map for memory 108 indicating preferable memory locations in light of these access patterns, DSO 200 may store application data in these memory locations of memory 108 so as to improve application performance and/or reduce memory related latencies.

In some embodiments, storing, using a memory map, application data in one or more memory locations may include storing a portion of the application data or a copy of the application data in each of the one or more memory locations.

In some embodiments, storing, using a memory map, application data in one or more memory locations may include storing a first portion or a first copy of the application data in a first memory location and a second portion or a second copy of the application data in a second memory location, wherein the first memory location and the second memory location are selected to improve performance, reduce row-buffer conflicts, reduce bank conflicts, minimize effects of row hammer attacks, and/or reduce memory related access latency.

In step 508, the application that uses the application data may be executed using the processor. For example, processor 106 may execute an application and use copies of application data stored in memory 108 for improving application performance and/or other purposes.

It will be appreciated that process 500 is for illustrative purposes and that different and/or additional actions may be used. It will also be appreciated that various actions described herein may occur in a different order or sequence.

It should be noted that computing platform 100, DSO 200, and/or functionality described herein may constitute a special purpose computing device. Further, computing platform 100, DSO 200, and/or functionality described herein can improve the technological field of storage optimization by determining preferable memory locations for storing copies or portions of application data for improved performance when executing a related application. Furthermore, computing platform 100, DSO 200, and/or functionality described herein can improve the technological field of computing since using preferable memory locations for storing copies or portions of application data can allow applications to load and execute more efficiently than computers that do not optimize storage of application data in memory.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for optimizing storage of application data in memory, the method comprising:
   receiving application data associated with an application;
   generating, using information about the application, information about a processor, and information about a memory, a memory map indicative of where data associated with physical memory addresses are stored in a memory chip of the memory;
   selecting, using the memory map, two or more memory locations in the memory for storing the application data, wherein the two or more memory locations are in different memory banks of the memory chip, wherein the two or more memory locations improve application performance by reducing memory access related latencies during execution of the application;
   storing the application data in the two or more memory locations, wherein storing the application data in the two or more memory locations includes storing a copy of the application data in each of the two or more memory locations; and
   executing, using the processor, the application that uses the application data, wherein executing the application includes concurrently accessing different portions of the application data from the two or more memory locations, wherein concurrently accessing different portions of the application data from the two or more memory locations includes accessing at least some application data from the different memory banks of the memory chip simultaneously.

2. The method of claim 1 wherein generating the memory map includes identifying, based on memory access latency analysis, memory address sets, wherein each set includes memory addresses having a same rank, bank, row or channel, and determining, using the memory address sets, address mapping information usable for selecting particular memory locations in the memory.

3. The method of claim 1 wherein generating the memory map includes using predetermined address mapping information associated with the memory.

4. The method of claim 1 wherein generating the memory map includes executing the application or a simulated application for identifying a memory access profile and using the memory access profile for identifying the two or more memory locations in the memory for storing the application data.

5. The method of claim 1 wherein the memory includes a static random-access memory (SRAM), a dynamic random-access memory (DRAM), a 3D XPoint memory, a random-access memory, a solid state memory, a non-volatile memory, or a volatile memory.

6. The method of claim 1 wherein the processor includes a central processing unit, a multi-core processor, a single-core processor, a digital signal processor, a microprocessor, or a vector processor.

7. The method of claim 1 wherein the information about the application includes information about how often the application data is accessed or information about when the application data is accessed.

8. The method of claim 1 wherein the information about the processor includes a memory bandwidth associated with the processor or a processing rate associated with the processor.

9. The method of claim 1 wherein the information about the memory includes memory timing information, a memory clock, a cycle time, a bus clock, a data rate, a peak transfer rate, or a column address strobe latency.

10. The method of claim 1 wherein storing, using the memory map, the application data in the two or more memory locations includes storing a first portion or a first copy of the application data in a first memory location and a second portion or a second copy of the application data in a second memory location, wherein the first memory location and the second memory location are selected to improve performance, minimize effects of row hammer attacks, or reduce memory related access latency.

11. A system for optimizing storage of application data in memory, the system comprising:
   a first processor; and
   a data storage optimizer implemented using the first processor, wherein the data storage optimizer is configured to receive application data associated with an application, to generate, using information about the application, information about a second processor, and information about a memory, a memory map indicative of where data associated with physical memory addresses are stored in a memory chip of the memory, to select, using the memory map, two or more memory locations in the memory for storing the application data, to store, using the memory map, the application data in the two or more memory locations, wherein the two or more memory locations are in different memory banks of the memory chip, wherein the data storage optimizer is configured to store a copy of the application data in each of the two or more memory locations, wherein the two or more memory locations improve application performance by reducing memory access related latencies during execution of the application, and to execute, using the second processor, the application that uses the application data, wherein executing the application includes concurrently accessing different portions of the application data from the two or more memory locations, wherein concurrently accessing different portions of the application data from the two or more memory locations includes accessing at least some application data from the different memory banks of the memory chip simultaneously.

12. The system of claim 11 wherein the data storage optimizer is configured to identify, based on memory access latency analysis, memory address sets, wherein each set includes memory addresses having a same rank, bank, row, or channel, and to determine, using the memory address sets, address mapping information usable for selecting particular memory locations in the memory.

13. The system of claim 11 wherein the data storage optimizer is configured to use predetermined address mapping information associated with the memory.

14. The system of claim 11 wherein the data storage optimizer is configured to execute the application or a simulated application for identifying a memory access profile and to use the memory access profile for identifying the two or more memory locations in the memory for storing the application data.

15. The system of claim 11 wherein the memory includes a static random-access memory (SRAM), a dynamic random-access memory (DRAM), a 3D XPoint memory, a random-access memory, a solid state memory, a non-volatile memory, or a volatile memory.

16. The system of claim 11 wherein the second processor includes a central processing unit, a multi-core processor, a single-core processor, a digital signal processor, a microprocessor, or a vector processor.

17. The system of claim 11 wherein the information about the application includes information about how often the application data is accessed or information about when the application data is accessed.

18. The system of claim 11 wherein the information about the second processor includes a memory bandwidth associated with the second processor or a processing rate associated with the second processor.

19. The system of claim 11 wherein the information about the memory includes memory timing information, a memory clock, a cycle time, a bus clock, a data rate, a peak transfer rate, or a column address strobe latency.

20. The system of claim 11 wherein the data storage optimizer is configured to store a first portion or a first copy of the application data in a first memory location and a second portion or a second copy of the application data in a second memory location, wherein the first memory location and the second memory location are selected to improve performance, minimize effects of row hammer attacks, or reduce memory related access latency.

21. A non-transitory computer readable medium having stored thereon executable instructions embodied in the non-transitory computer readable medium that when executed by at least one processor of at least one computer cause the at least one computer to perform steps comprising:
   receiving application data associated with an application;
   generating, using information about the application, information about a processor, and information about a memory, a memory map indicative of where data associated with physical memory addresses are stored in a memory chip of the memory;
   selecting, using the memory map, two or more memory locations in the memory for storing the application data, wherein the two or more memory locations are in different memory banks of the memory chip, wherein the two or more memory locations improve application performance by reducing memory access related latencies during execution of the application;

storing the application data in the two or more memory locations, wherein storing the application data in the two or more memory locations includes storing a copy of the application data in each of the two or more memory locations; and executing, using the processor, the application that uses the application data, wherein executing the application includes concurrently accessing different portions of the application data from the two or more memory locations, wherein concurrently accessing different portions of the application data from the two or more memory locations includes accessing at least some application data from the different memory banks of the memory chip simultaneously.

* * * * *